(12) United States Patent
Guerreiro (10) Patent No.: US 10,846,557 B2
(45) Date of Patent: Nov. 24, 2020

(54) METHOD AND APPARATUS FOR GLARE DETECTION

(71) Applicant: Continental Automotive GmbH, Hannover (DE)

(72) Inventor: Rui Guerreiro, Hove (GB)

(73) Assignee: Continental Automotive GmbH, Hannover (DE)

( * ) Notice: Subject to any disclaimer, the term of this patent is extended or adjusted under 35 U.S.C. 154(b) by 83 days.

(21) Appl. No.: 15/910,521

(22) Filed: Mar. 2, 2018

(65) Prior Publication Data

US 2018/0197039 A1    Jul. 12, 2018

Related U.S. Application Data (63) Continuation of application No. PCT/EP2016/066468, filed on Jul. 12, 2016.

(30) Foreign Application Priority Data

Sep. 3, 2015 (EP) ..................................... 15183649

(51) Int. Cl.
*G06K 9/46* (2006.01)
*B60K 35/00* (2006.01)
*B60R 1/00* (2006.01)
*G06K 9/62* (2006.01)

(52) U.S. Cl.
CPC ............ *G06K 9/4647* (2013.01); *B60K 35/00* (2013.01); *B60R 1/00* (2013.01); *G06K 9/6212* (2013.01); *G06K 9/6215* (2013.01); *B60K 2370/176* (2019.05); *B60K 2370/178* (2019.05); *B60R 2300/30* (2013.01)

(58) Field of Classification Search
CPC .. G06K 9/4647; G06K 9/6212; G06K 9/6215; B60R 1/00; B60R 2300/30
See application file for complete search history.

(56) References Cited

U.S. PATENT DOCUMENTS

| 7,206,725 | B1 | 4/2007 | Alspach | |
|---|---|---|---|---|
| 2003/0185420 | A1* | 10/2003 | Sefcik | G06K 9/3241 |
| | | | | 382/103 |
| 2004/0008410 | A1* | 1/2004 | Stam | H01L 27/14621 |
| | | | | 359/443 |
| 2004/0052432 | A1* | 3/2004 | Lee | G06T 3/4023 |
| | | | | 382/298 |

(Continued)

FOREIGN PATENT DOCUMENTS

| EP | 2172873 A2 | 12/2013 |
|---|---|---|
| JP | 2005136852 A | 5/2005 |
| JP | 2015142357 A | 8/2015 |

OTHER PUBLICATIONS

Google Scholar Search Results.*

(Continued)

*Primary Examiner* — Qun Shen (57) ABSTRACT

A glare detection apparatus for detection of at least one glare region within an image includes a processing unit configured to aggregate image pixels of the image having a high luminance intensity to bright image areas within the image and to calculate for image pixels around each bright image area gradients expected in case of a glare and actual gradients and configured to increase a glare diameter of a glare region around the respective bright image area as long as the calculated actual gradients match the calculated expected gradients.

9 Claims, 5 Drawing Sheets

(56) References Cited

U.S. PATENT DOCUMENTS

| | | | | |
|---|---|---|---|---|
| 2009/0010494 A1* | 1/2009 | Bechtel | ............... | G01S 11/12 |
| | | | | 382/104 |
| 2009/0147116 A1* | 6/2009 | Koyama | ............... | B60R 1/00 |
| | | | | 348/294 |
| 2009/0161983 A1 | 6/2009 | Ciurea | | |
| 2010/0172542 A1* | 7/2010 | Stein | ............... | G06K 9/00798 |
| | | | | 382/103 |
| 2011/0023845 A1* | 2/2011 | Allain | ............... | F02M 26/49 |
| | | | | 123/568.16 |
| 2011/0280454 A1* | 11/2011 | Su | ............... | G06T 1/00 |
| | | | | 382/117 |
| 2013/0027540 A1* | 1/2013 | Ito | ............... | G01B 11/08 |
| | | | | 348/79 |
| 2013/0076866 A1* | 3/2013 | Drinkard | ............... | H04N 7/181 |
| | | | | 348/47 |
| 2013/0094705 A1* | 4/2013 | Tyagi | ............... | G06K 9/00369 |
| | | | | 382/103 |
| 2013/0101161 A1* | 4/2013 | Faber | ............... | G01J 1/18 |
| | | | | 382/103 |
| 2013/0329132 A1* | 12/2013 | Tico | ............... | H04N 5/14 |
| | | | | 348/571 |

OTHER PUBLICATIONS

International Search Report and Written Opinion dated Nov. 18, 2018 from corresponding International Patent Application No. PCT/EP2016/066468.

European Search Report dated Jan. 19, 2016 for corresponding European Patent Application No. 15183649.1.

Japanese Decision to Grant a patent drafted Apr. 2, 2020 for the counterpart Japanese Patent Application No. 2018-511443.

* cited by examiner

METHOD AND APPARATUS FOR GLARE DETECTION

CROSS REFERENCE TO RELATED APPLICATION

This application is a continuation of International application No. PCT/EP2016/066468, filed Jul. 12, 2016, which claims priority to European patent application No. 15183649.1, filed on Sep. 3, 2015, each of which is hereby incorporated by reference.

TECHNICAL FIELD

The technical field relates to generally to a method and apparatus for glare detection within an image provided by a camera, and more specifically to method and apparatus for glare detection within an image provided by a camera of a driver assistance system.

BACKGROUND

In an automatic system that makes use of visual data, the image captured by a camera does not always correspond to the surroundings. This can occur due to media on the camera lens which obstruct the lens completely or at least partially or due to glare caused by sunlight or headlights of other objects.

A glare creates a halolike effect around a light source which prevents a camera from capturing what is behind the halo. Since an approaching vehicle, pedestrian or object may be invisible due to glare, the driver or a driver assistance system must be alert since some areas of the surrounding are not covered by the captured image. Further, glare regions in the captured image may cause subsequent processes of a driver assistance system to fail or to give false detection.

Figure 1A:
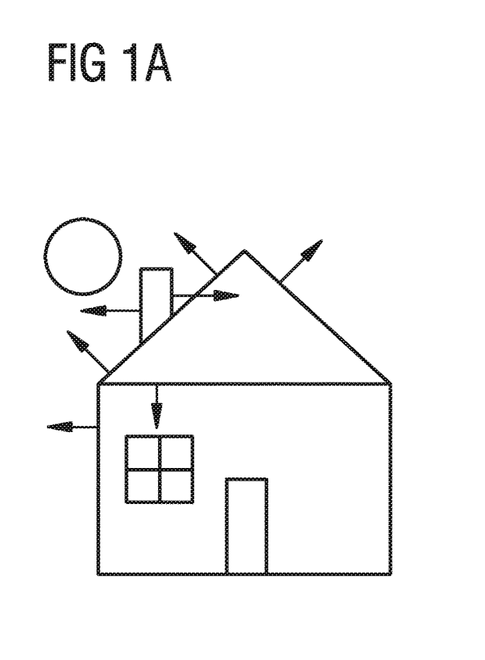
FIGS. 1A and 1B show diagrams illustrating a problem underlying the present disclosure.
Figure 1B:
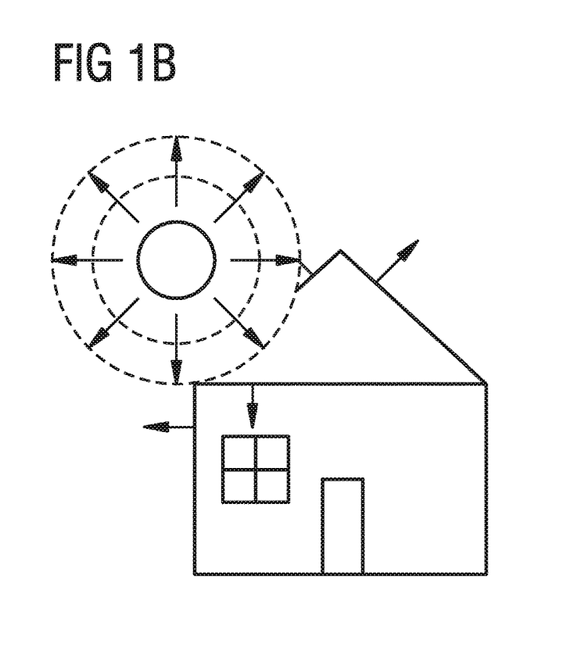

FIGS. 1A and 1B show a situation with and without glare. The light source in the given example is the sun standing over a roof of a house. FIG. 1A shows a situation without glare where the bright light source (the inner circle) does not obstruct neighboring details. In FIG. 1B, a glare halo is shown around the light source obstructing details of the house.

In conventional methods, a glare is simply detected as image pixels that are maximally saturated. For example, with a camera that represents luminance with 8 bits, pixels having a luminance equal to 255 are maximally saturated and are detected to form a glare within the captured image. However, the conventional method is not very reliable, because a glare can also originate in an image area where the image pixels are not maximally saturated.

As such, it is desirable to present a method and apparatus which can reliably detect a glare within a captured image. In addition, other desirable features and characteristics will become apparent from the subsequent summary and detailed description, and the appended claims, taken in conjunction with the accompanying drawings and this background.

SUMMARY

A glare detection method for detection of at least one glare region within an image is presented. The method includes aggregating image pixels of the image having a high luminance intensity into bright image areas within the image. The method also includes calculating, for image pixels around each bright image area, gradients expected in case of a glare and actual gradients. The method further includes increasing a glare diameter of a glare region around the respective bright image area as long as the calculated actual gradients match the calculated expected gradients.

In a possible embodiment of the glare detection method, similarity metrics between the calculated actual gradients and the calculated expected gradients are computed.

In a further possible embodiment of the glare detection method, an average similarity value of the computed similarity values for image pixels being located in a neighboring image area around the respective bright image area and being equidistant to the respective bright image area is calculated.

In a still further possible embodiment of the glare detection method, an average similarity value is calculated with a stepwise increased distance between the equidistant image pixels of the neighboring image area and the respective bright image area until the respective calculated average similarity value becomes smaller than a predetermined threshold value, wherein the equidistant image pixels of the last incrementing step define the outer boundary of the glare region within the image.

In a further possible embodiment of the glare detection method, the image forms part of an image sequence of images provided by a camera.

In a further possible embodiment of the glare detection method, a glare is detected if a glare region is detected around a bright image area for a predetermined number of images in the image sequence provided by the camera.

In a still further possible embodiment of the glare detection method, the image is generated by a camera of a vehicle.

In a further possible embodiment of the glare detection method, the image provided by the camera is a digital image having a plurality of pixels each having a luminance intensity.

In a further possible embodiment of the glare detection method, the image is downscaled and the downscaled image is scanned for image pixels having a high luminance intensity above a predetermined luminance intensity threshold.

In a still further possible embodiment of the glare detection method, the image pixels of the downscaled image having a high luminance intensity above the predetermined luminance intensity threshold are aggregated into connected areas labelled as bright image areas of the image.

A glare detection apparatus for detection of at least one glare region within an image is also presented. The apparatus includes a processing unit configured to aggregate image pixels of the image having a high luminance intensity to bright image areas within the image and to calculate for image pixels around each bright image area gradients expected in case of a glare and actual gradients and being configured to increase a glare diameter of a glare region around the respective bright image area as long as the calculated actual gradients match the calculated expected gradients.

In a possible embodiment of the glare detection apparatus, the apparatus is further configured to compute similarity metrics between the calculated actual gradients and the calculated expected gradients and is configured to calculate an average similarity value of the computed similarity values for image pixels being located in a neighboring image area around the respective bright image area and being equidistant to the respective bright image area.

In a further possible embodiment of the glare detection apparatus, the processing unit is configured to calculate an average similarity value with a stepwise increased distance between the equidistant image pixels of the neighboring image area and the respective bright image area until the respective calculated average similarity value becomes smaller than a predetermined threshold value, wherein the equidistant image pixels of the last incrementing step define the outer boundary of the glare region within the image.

In a further possible embodiment of the glare detection apparatus, the apparatus further includes a downscaling unit adapted to downscale the image, wherein the downscaled image is scanned by the processing unit for image pixels having a high luminance intensity above a predetermined luminance intensity threshold, wherein image pixels of the downscaled image having a high luminance intensity above the predetermined luminance intensity are aggregated by the processing unit into connected areas labelled as bright image areas of the image.

A driver assistance system of a vehicle is also provided. The system includes at least one camera configured to provide images of the vehicle's surroundings and a glare detection apparatus.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Figure 2:
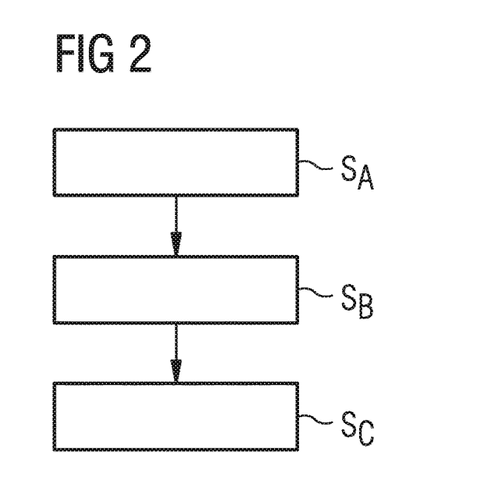
FIG. 2 shows a flowchart of a possible exemplary embodiment of a glare detection method.

The glare detection method as shown in FIG. 2 is provided for detection of at least one glare region within an image. The image can be a digital image captured by a camera of a system. In a possible embodiment, the image is a digital image captured by a vehicle camera of a driver assistance system. In a possible embodiment, the camera can be a fisheye camera of a surround view system of a vehicle. The image can be taken by the camera from the front, back, left or right side of the vehicle.

At SA, image pixels of the captured image having a high luminance intensity are aggregated into bright image areas BIA within the image.

At SB, for image pixels around each bright image area BIA gradients expected in case of a glare and actual gradients are calculated.

At SC, a glare diameter of a glare region around the respective bright image area BIA is increased as long as the calculated actual gradients match the calculated expected gradients.

In a possible embodiment, of the glare detection method similarity metrics between the calculated actual gradients and the calculated expected gradients are computed at SC. Further, an average similarity value of the computed similarity values for image pixels being located in a neighboring image area NIA around the respective bright image area BIA and being equidistant to the respective bright image area BIA can be calculated. The average similarity value is calculated with a stepwise increasing distance between the equidistant image pixels IP of the neighboring image area NIA and the respective bright image area BIA until the respective calculated average similarity value becomes smaller than a predetermined threshold value. The equidistant image pixels IP of the last incrementing step define the outer boundary of the glare region within the captured image.

Figure 3:
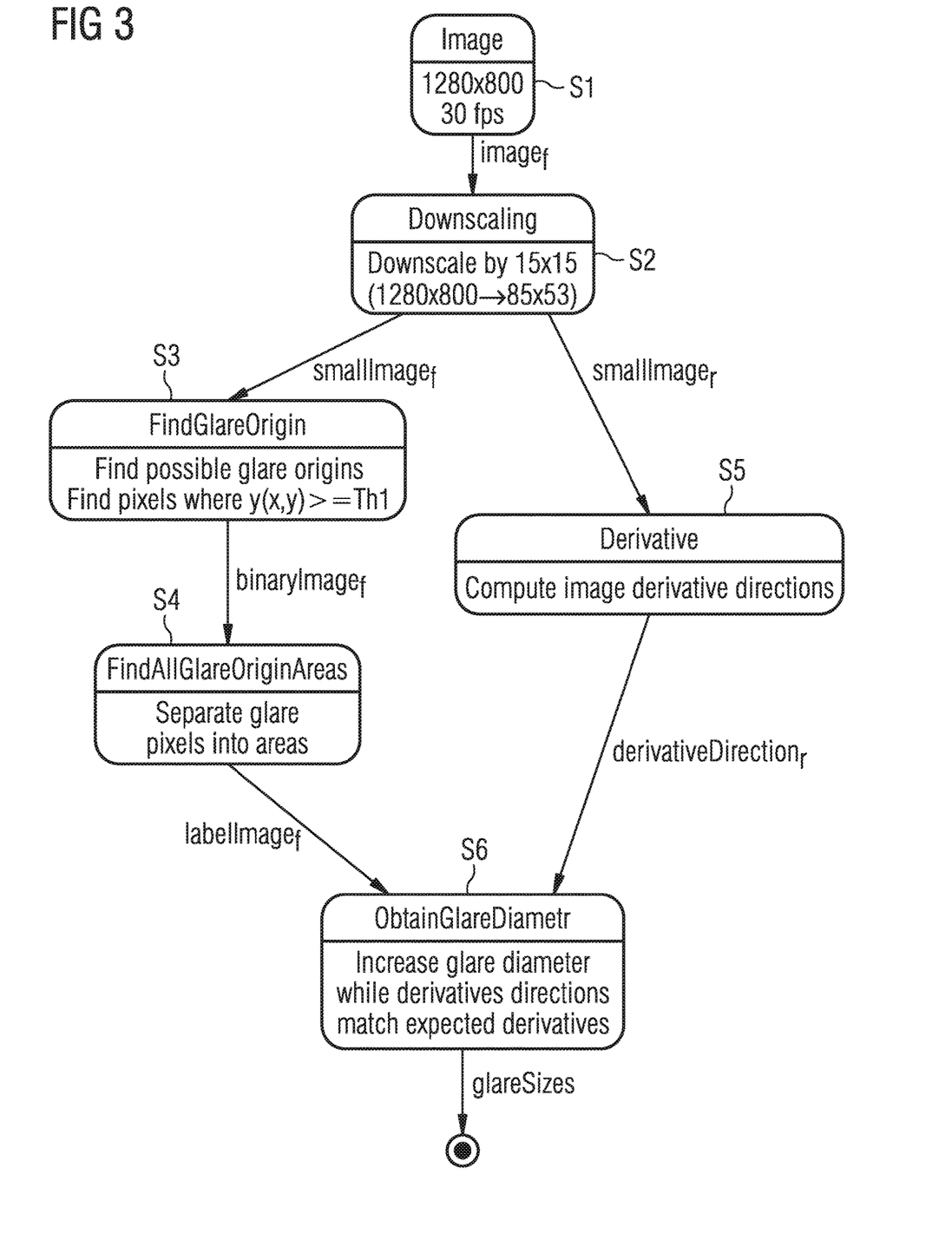
FIG. 3 shows a further flowchart of a possible embodiment of a glare detection method.

FIG. 3 shows a flowchart of a possible exemplary embodiment of a glare detection method At S1, an image is captured by a camera. The image may include for instance 1280×800 image pixels.

At S2, the image is downscaled and the downscaled image is then scanned for image pixels having a high luminance intensity above a predetermined luminance intensity threshold. This is done to reduce computational complexity and to reduce the effect of image noise. For example, the captured image can be reduced by a factor 15 in each direction, i.e. the downscaled image has a size being smaller by a factor of 15 when compared to the original captured image in each direction. If the original captured image has a size of 1280×800 image pixels the downscaled image has a size of 85×53 image pixels as illustrated in FIG. 3.

The downscaled image is then scanned, at S3, for pixels that have a very high intensity value, for example 255 in an 8 bit luminance image starting at zero.

These high intensity image pixels are then aggregated into bright image areas BIA within the image. In a possible embodiment, the image pixels of the downscaled image having a high luminance intensity above a predetermined luminance intensity threshold are aggregated into connected areas labelled as bright image areas of the image. For each labelled bright image area BIA, the central pixel can be found, at S4, for example, through a simple average of the position of the pixels in the respective area.

Since the gradient direction within glare regions is the same as an angle formed by the mean pixel of the area and the current image pixel as illustrated by the arrows in FIG. 1B, a set of expected gradient angles is computed in step S5 in the neighboring image area NIA of the bright image source. As can be seen in FIG. 3, in another branch of the illustrated flowchart the downscaled image is loaded and an actual gradient that is seen on the image is computed. Finally, given the gradient that is expected in case of a glare and the actual gradient in the captured image, a metric of similarity between the two values can be calculated for circles that are progressively further away from the bright light source, at S5. Accordingly, with the method in the illustrated embodiment, for image pixels IP around each bright image area BIA, gradients expected in case of a glare and actual gradients are calculated at S5.

A glare diameter of a glare region around the respective bright image area is increased as long as the calculated actual gradients match the calculated expected gradients, at S6. For a circular glare, for each radius, progressively further away from the center of the bright light source a number given by the average similarity metrics of the image pixels in the respective circle is computed. If the similarity metric becomes too low, it is deemed that the other boundary of the glare region has been reached. The average similarity value is calculated with a stepwise increased distance between the equidistant image pixels IP of the neighboring image area NIA and the respective bright image area BIA until the respective calculated average similarity value becomes smaller than a predetermined threshold value wherein the equidistant image pixels IP of the last incrementing step define the outer boundary of the glare region within the respective image.

Figure 5:
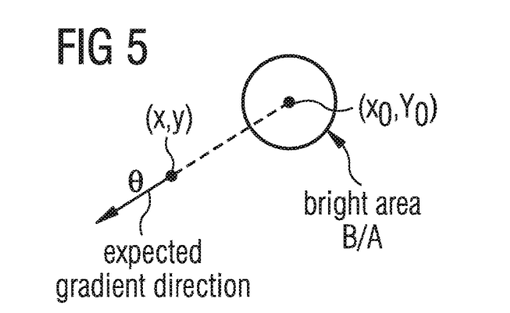
FIG. 5 shows a diagram for illustrating the operation of a method and apparatus.

In more detail, if a pixel $(x_0, y_0)$ is the computed center of a high luminance intensity area and $(x, y)$ is a pixel in the neighborhood as illustrated in FIG. 5, a gradient that is expected for a glare pixel in $(x, y)$ is $$\theta_0 = \tan^{-1}(y-y_0, x-x_0) \quad (1)$$

The actual gradient of the captured image can be calculated by:

$$\frac{dI}{dx} = I * \begin{pmatrix} 1/3 & 0 & -1/3 \\ 1/3 & 0 & -1/3 \\ 1/3 & 0 & -1/3 \end{pmatrix} \quad (2)$$

$$\frac{dI}{dy} = I * \begin{pmatrix} 1/3 & 1/3 & 1/3 \\ 0 & 0 & 0 \\ -1/3 & -1/3 & -1/3 \end{pmatrix}$$

$$\theta = \tan^{-1}\left(\frac{dI}{dy}, \frac{dI}{dx}\right)$$

The computation of the similarity metric between the expected angle and the actual angle can comprise several substeps. In a first substep, the difference between the angles is computed.

$$\theta_\Delta = \min(|\theta-\theta_0|, 2\pi - |\theta-\theta_0|)$$

Then, the angle difference can be used to compute a similarity metric $\epsilon [-1, 1]$, where 1 means that the values are identical and −1 that the values are conflicting, as follows:

$$\epsilon = \max\left(1 - \frac{3\theta_\Delta}{\pi}, -1\right).$$

Figure 6:
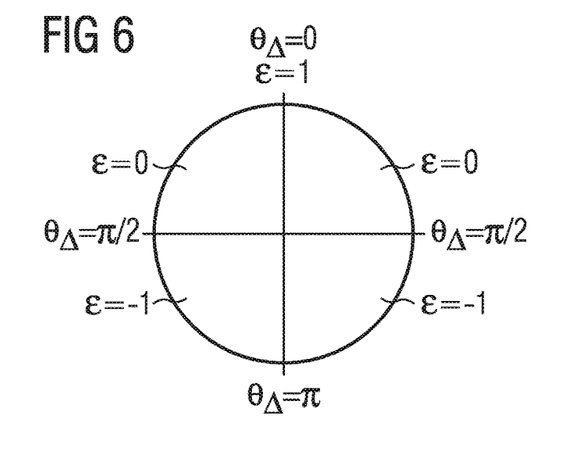
FIG. 6 shows a similarity metric as a function of an angle difference illustrating a possible implementation of a method and apparatus.

A visual representation of the possible values of the similarity metric £ as a function of the difference between the angles is shown in FIG. 6.

As illustrated in FIG. 6, only gradients that are aligned with the respective gradient contribute positively to an assessment of whether the image pixels of a particular radius from the center of the bright image area constitute glare.

Figure 7:
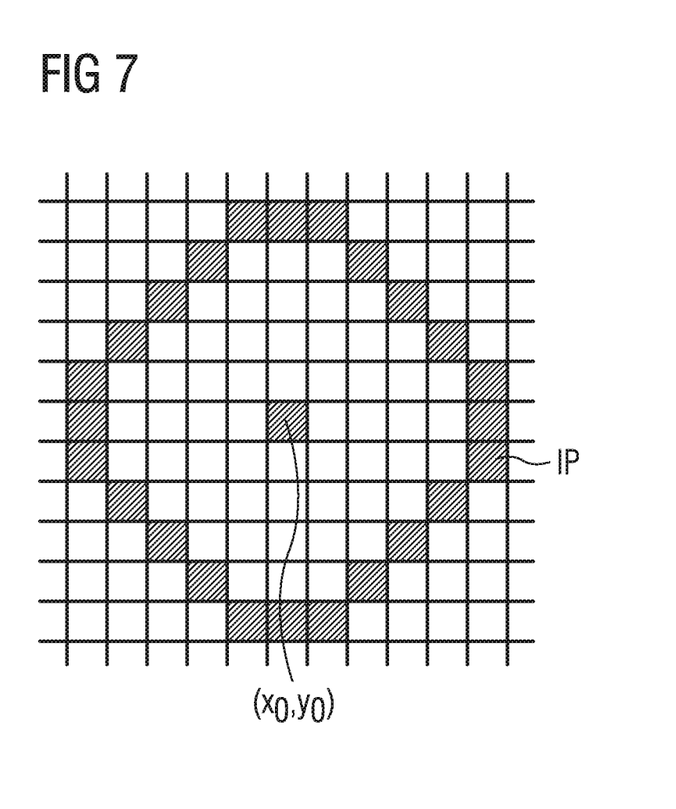
FIG. 7 shows a diagram for illustrating a possible exemplary implementation of the method and apparatus.

To assess if the image pixels IP at a particular radius r constitute glare, the following steps can be performed for a radius becoming progressively larger starting at 1. First, the image pixels IP at a particular radius from the center of the bright image area $(x_0, y_0)$ are identified. FIG. 7 illustrates such image pixels for a radius r=5 around the center pixel $(x_0, y_0)$.

To compute a similarity between the direction of the gradients of the image pixels IP at that radius r and the expected gradient all similarity metrics of such image pixels can be added and divided by the number of pixels, i.e. a mean similarity metric for that radius r is calculated. If the mean similarity metric is above a certain threshold TH it is considered that there is glare and the radius r is incremented and the next radius is checked. In a possible implementation, a similarity threshold of 0.5 can be used. If the mean similarity metric is below this threshold the limit or outer boundary of the glare region has been reached and the process stops. Because there is no information propagated along time, the detection of the glare according to the method of the present invention occurs instantaneously. In a possible embodiment, a glare is only detected if a glare region is detected around a bright image area BIA for a predetermined number N of images in an image sequence provided by a camera. In this embodiment, by requiring that glare detections are consistent along time, a glare is detected only if it is visible around the same area for N frames.

With the glare detection method described herein it is possible to detect circular shaped glare regions. In cases where the glare is not circular, an equivalent yet adapted process can be used. For example, if the glare exhibits a vertical streak the computation of the center $(x_0, y_0)$ of the bright image area BIA and how equidistant points are found can be adapted. If $'\Omega$ is a set of very bright points or pixels, for any pixel $(x, y)$ one can find a pixel $(x_0, y_0) \in '\Omega$ that is closest to the respective pixel $(x, y)$. Starting from here, the process can proceed as described above using equation (1) to compute the expected angles, equation (2) to compute the actual angles and then equations (3) and (4) to compute similarity metrics. At the end of the process instead of collecting the similarity metrics at a given radius from the center of the bright area, these similarity metrics are collected for pixels whose distance at any point in set $'\Omega$ is given by a radius r.

Figure 8:
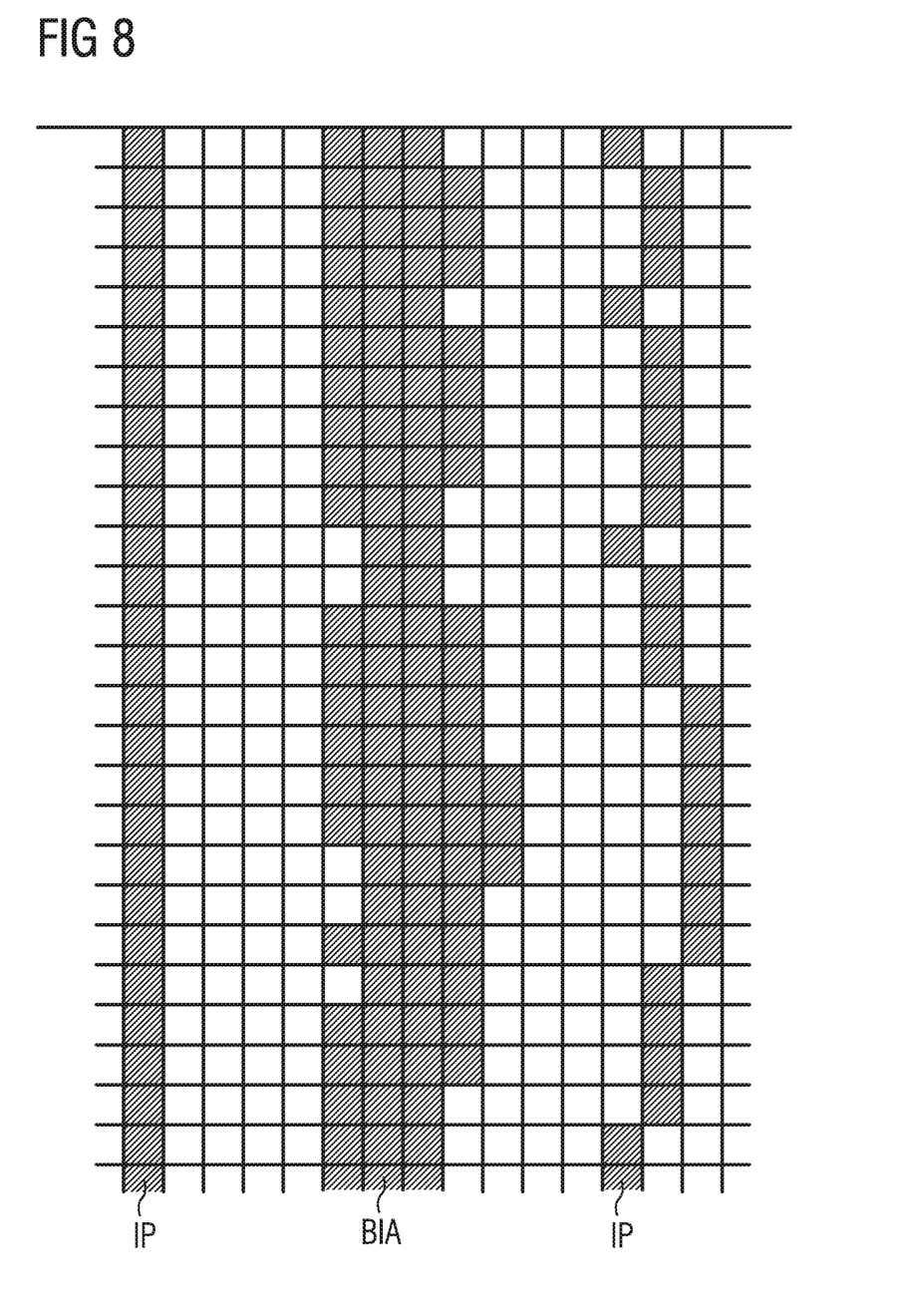
FIG. 8 shows a further diagram for illustrating a possible exemplary implementation of a method and apparatus.

FIG. 8 illustrates such equidistant image points IP of the set $'\Omega$ at a distance r=5. If the similarity metric for a given radius r is above a threshold the radius r is incremented and the next set of pixels is checked. This process continues until the similarity becomes smaller than a predetermined threshold value.

Figure 4:
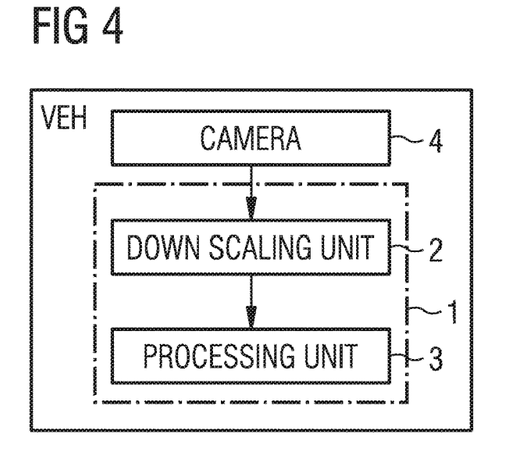
FIG. 4 shows a block diagram of a possible exemplary embodiment of a glare detection apparatus.

FIG. 4 shows a block diagram of a possible exemplary embodiment of a glare detection apparatus 1. The glare detection apparatus 1 includes in the illustrated embodiment a downscaling unit 2 and a processing unit 3. The downscaling unit 2 is adapted to downscale an image received from at least one camera 4 as shown in FIG. 4. The camera 4 can be a camera of a surround view system of a vehicle. The camera 4 can be at the front, back, left or right side of the respective vehicle VEH. The downscaling unit 2 is adapted to downscale the received digital image. The glare detection apparatus 1 further comprises a processing unit 3 configured to aggregate image pixels of the image having a high luminance intensity to bright image areas BIA within the image. The processing unit 3 is further adapted to calculate for image pixels around each bright image area BIA gradients expected in case of a glare and actual gradients. The processing unit 3 is further configured to increase a glare diameter of a glare region around the respective bright image area BIA as long as the calculated actual gradients match the calculated expected gradients. In a possible embodiment, the processing unit 3 is configured to compute similarity metrics between the calculated actual gradients and the calculated expected gradients and is configured to calculate an average similarity value of the computed similarity values for image pixels being located in a neighboring image area NIA around the respective bright image area BIA and being equidistant to the respective bright image area BIA. In a possible embodiment, the processing unit 3 of the apparatus 1 is configured to calculate an average similarity value with a stepwise increased distance between the equidistant image pixels IP of the neighboring image area NIA and the respective bright image area BIA until the respective calculated average similarity value becomes smaller than a predetermined threshold value. The equidistant image pixels IP of the last incrementing step define then the outer boundary of the glare region within the received image.

In a possible embodiment, the processing unit 3 further processes the found glare region within the captured image. In a possible embodiment, the found glare region is filtered. In a further embodiment, another application program is informed about the detected glare region. In a still further possible embodiment, the processing unit 3 outputs a warning if a glare region in the captured image is detected.

The glare detection apparatus 1 as shown in FIG. 4 can form part of a driver assistance system of a vehicle VEH. The driver assistance system comprises at least one camera 4 configured to provide an image of the vehicle's VEH surrounding and the glare detection apparatus 1 as shown in FIG. 4.

The method and apparatus can also be employed in other systems, in particular surveillance systems, manufacturing systems and consumer electronic devices.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A glare detection method for detection of at least one glare region within an image, said method comprising:
    aggregating image pixels of the image having a high luminance intensity into bright image areas within the image, the high luminance intensity being an intensity above a predetermined threshold;
    calculating for image pixels around each bright image area gradient directions expected in case of a glare and actual gradient directions;
    increasing a glare diameter of a glare region around the respective bright image area as long as the calculated actual gradients match the calculated expected gradients;
    computing similarity metrics between the calculated actual gradient directions and the calculated expected gradient directions; and
    computing an average similarity value of the computed similarity values for image pixels being located in a neighboring image area around the respective bright image area and being equidistant to the respective bright image area;
    wherein the average similarity value is calculated with a stepwise increased distance between the equidistant image pixels of the neighboring image area and the respective bright image area until the respective calculated average similarity value becomes smaller than a predetermined threshold value, and wherein the equidistant image pixels of the last incrementing step define the outer boundary of the glare region within the image.

2. The glare detection method according to claim 1 wherein the image is part of an image sequence of images provided by a camera.

3. The glare detection method according to claim 2 wherein a glare is detected if a glare region is detected around a bright image area for a predetermined number N of images in the image sequence provided by the camera.

4. The glare detection method according to claim 2 wherein the image is generated by a camera of a vehicle.

5. The glare detection method according to claim 2 wherein the image provided by the camera is a digital image comprising a plurality of pixels each having a luminance intensity.

6. The glare detection method according to claim 1 wherein the image is downscaled and the downscaled image is scanned for image pixels having a high luminance intensity above a predetermined luminance intensity threshold.

7. The glare detection method according to claim 6 wherein the image pixels of the downscaled image having a high luminance intensity above the predetermined luminance intensity threshold are aggregated into connected areas labelled as bright image areas of the image.

8. A glare detection apparatus for detection of at least one glare region within an image, said apparatus comprising:
    a processing unit configured to aggregate image pixels of the image having a high luminance intensity to bright image areas within the image, the high luminance intensity being an intensity above a predetermined threshold, and to calculate for image pixels around each bright image area gradient directions expected in case of a glare and actual gradient directions and configured to increase a glare diameter of a glare region around the respective bright image area as long as the calculated actual gradient directions match the calculated expected gradient directions;
    wherein said processing unit is further configured to compute similarity metrics between the calculated actual gradient directions and the calculated expected gradient directions and is configured to calculate an average similarity value of the computed similarity values for image pixels being located in a neighboring image area around the respective bright image area and being equidistant to the respective bright image area;
    wherein said processing unit is configured to calculate an average similarity value with a stepwise increased distance between the equidistant image pixels of the neighboring image area and the respective bright image area until the respective calculated average similarity value becomes smaller than a predetermined threshold value; and
    wherein the equidistant image pixels of the last incrementing step define the outer boundary of the glare region within the image.

9. The glare detection apparatus according to claim 8 wherein said apparatus further comprises a downscaling unit adapted to downscale the image,
    wherein said downscaled image is scanned by the processing unit for image pixels having a high luminance intensity above a predetermined luminance intensity threshold,
    wherein image pixels of the downscaled image having a high luminance intensity above the predetermined luminance intensity are aggregated by the processing unit into connected areas labelled as bright image areas of the image.

* * * * *